US010746544B2

(12) United States Patent
Miguel Sànchez et al.

(10) Patent No.: US 10,746,544 B2
(45) Date of Patent: Aug. 18, 2020

(54) OPTOELECTRONIC MODULES AND METHODS FOR OPERATING THE SAME

(71) Applicant: ams Sensors Singapore Pte. Ltd., Singapore (SG)

(72) Inventors: Javier Miguel Sànchez, Zurich (CH); Miguel Bruno Vaello Paños, Zurich (CH)

(73) Assignee: ams Sensors Singapore Pte. Ltd, Singapore (SG)

( * ) Notice: Subject to any disclaimer, the term of this patent is extended or adjusted under 35 U.S.C. 154(b) by 44 days.

(21) Appl. No.: 16/073,168

(22) PCT Filed: Jan. 27, 2017

(86) PCT No.: PCT/SG2017/050041
§ 371 (c)(1),
(2) Date: Jul. 26, 2018

(87) PCT Pub. No.: WO2017/131586
PCT Pub. Date: Aug. 3, 2017

(65) Prior Publication Data
US 2019/0033071 A1   Jan. 31, 2019

Related U.S. Application Data

(60) Provisional application No. 62/288,575, filed on Jan. 29, 2016.

(51) Int. Cl.
G01C 3/10 (2006.01)
G01S 17/36 (2006.01)
(Continued)

(52) U.S. Cl.
CPC .............. *G01C 3/10* (2013.01); *G01S 7/4873* (2013.01); *G01S 7/497* (2013.01); *G01S 7/51* (2013.01); *G01S 17/36* (2013.01)

(58) Field of Classification Search
CPC ......... G01C 3/10; G01S 7/4873; G01S 7/497; G01S 7/51; G01S 17/36
See application file for complete search history.

(56) References Cited

U.S. PATENT DOCUMENTS 6,023,322 A   2/2000 Bamberger
8,718,962 B2  5/2014 Hsu et al.
(Continued)

FOREIGN PATENT DOCUMENTS

AT   513 402 B1   9/2014
CN   102741702 A  10/2012
(Continued)

OTHER PUBLICATIONS

European Patent Office; Extended European Search Report mailed in counterpart European patent application No. 17744656.4 (dated Jan. 21, 2019).
(Continued)

Primary Examiner — Jamil Ahmed
(74) Attorney, Agent, or Firm — Michael Best & Friedrich LLP

(57) ABSTRACT

An optoelectronic module includes a non-transitory computer-readable medium comprising machine-readable instructions stored thereon, that when executed on a processor, perform operations for calibrating the optoelectronic module and collecting distance data with the optoelectronic module. Methods for calibrating and collecting distance data include using an optoelectronic module with the non-transitory computer-readable medium that includes the aforementioned instructions. In some instances, a first target is highly reflective, and a second target is highly absorbing.

13 Claims, 6 Drawing Sheets

(51) Int. Cl.
*G01S 7/487* (2006.01)
*G01S 7/497* (2006.01)
*G01S 7/51* (2006.01)

(56) References Cited

U.S. PATENT DOCUMENTS

| | | | |
|---|---|---|---|
| 2011/0101231 A1* | 5/2011 | Rundle | G01T 7/005 250/370.09 |
| 2011/0121182 A1 | 5/2011 | Wong et al. | |
| 2011/0149071 A1* | 6/2011 | Oggier | G01S 7/497 348/140 |
| 2013/0004157 A1 | 1/2013 | Hakim | |
| 2014/0131551 A1 | 5/2014 | Lin et al. | |
| 2014/0340692 A1 | 11/2014 | Tan et al. | |
| 2015/0041630 A1 | 2/2015 | Heng et al. | |
| 2015/0124241 A1 | 5/2015 | Eisele et al. | |
| 2015/0145764 A1 | 5/2015 | Hiromi et al. | |

FOREIGN PATENT DOCUMENTS

| | | |
|---|---|---|
| CN | 103363951 A | 10/2013 |
| CN | 103884315 A | 6/2014 |
| CN | 104285160 A | 1/2015 |
| CN | 104303011 A | 1/2015 |
| WO | 2015/136099 | 9/2015 |

OTHER PUBLICATIONS

ISA/AU, International Search Report for PCT/SG2017/050041 (dated Mar. 17, 2017).

The National Intellectual Property Administration of the People's Republic of China First Office Action for Application No. 201780018936.9 dated Apr. 9, 2020 (16 pages including English translation).

* cited by examiner

OPTOELECTRONIC MODULES AND METHODS FOR OPERATING THE SAME

BACKGROUND

Optoelectronic modules, such as a proximity sensors and range imagining cameras, sometimes include at least one channel configured to transmit light to a target, and at least one channel configured to receive light reflected from the target. Further, optoelectronic modules sometimes include a transmissive element, such as an optical element, spectral filter, and/or cover glass placed between the channels and the target. In some cases, transmitted light may reflect from the transmissive element and may cause significant cross talk (e.g., light reflected from the transmissive element is collected by the channel configured to receive light).

Cross talk can produce spurious signals in some cases. For example, an optoelectronic module operable to collect distance information or three-dimensional data via the indirect time-of-flight technique can be affected by spurious signals produced by cross talk emanating from a transmissive element. A signal generated from light reflected from a target and a transmissive element and received by an array of demodulation pixels within a collection channel sometimes includes a component resulting from the target and a component resulting from the transmissive element. Based on the indirect time-of-flight technique, the signal can be converted into a vector having a magnitude corresponding to the signal fidelity (including the transmissive properties of the transmissive element), and a phase ostensibly corresponding to the distance to the target. The phase, however, can be affected strongly by the cross-talk and, in the absence of sufficient calibration data, the corresponding distance data may be inaccurate.

Methods for calibrating the cross talk due to the transmissive element of an optoelectronic module are known, but these methods sometimes require positioning a target at a very large distance (e.g., 10-30 meters or more) from the optoelectronic module. The long distances are often necessary to collect a pure cross talk signal. These methods can be impractical for a manufacturer or even an end user to implement. Accordingly, methods for calibrating and collecting distance data are needed that can be implemented within relatively short distances (e.g., less than a meter) such that a manufacturer or an end user of the optoelectronic module can perform the calibration measurements.

SUMMARY

This disclosure describes optoelectronic modules, non-transitory computer-readable mediums, and methods for operating the same. In some instances, the modules are operable to provide cross talk calibration data using targets positioned within a relatively small distance from the optoelectronic modules (e.g., less than a meter). In some instances, the calibration data can be applied to measurements executed by optoelectronic modules to improve the accuracy of said measurements. In some instances, a non-transitory computer-readable medium for operating an optoelectronic module, comprising instructions stored thereon, can, when executed on a processor, perform operations to provide cross talk calibration data, and provide measurements with improved accuracy.

A first aspect, for example, describes a method for operating an optoelectronic module. The optoelectronic module includes a transmission channel and a collection channel. The optoelectronic module can be operable to transmit light from the transmission channel and to receive light in the collection channel. The method includes: transmitting light from the transmission channel to a first target at a first distance; receiving light in the collection channel reflected from the first target at the first distance; converting the received light into a first signal A; saving the first signal A to a non-transitory computer-readable medium as a first vector A; transmitting light from the transmission channel to a second target at a second distance; receiving light in the collection channel reflected from the second target at the second distance; converting the received light into a second signal B; and saving the second signal B to the non-transitory computer-readable medium as a second vector B.

In second aspect describes another method for operating an optoelectronic module. The method includes positioning a transmissive element between a transmission channel and a collection channel and a first target and a second target; transmitting light from the transmission channel to the transmissive element and the first target at the first distance; receiving in the collection channel light reflected from the first target and light reflected from the transmissive element; converting the received light into a third signal C; saving the third signal C to a non-transitory computer-readable medium as a third vector C; transmitting light from the transmission channel to the transmissive element and the second target at the second distance; receiving in the collection channel light reflected from the second target and light reflected from the transmissive element; converting the received light into a fourth signal D; saving the fourth signal D to the non-transitory computer-readable medium as a fourth vector D; recalling (e.g., retrieving) a first vector A and the third vector C from the non-transitory computer-readable medium; performing an operation on the first vector A and the third vector C, the operation including dividing the magnitude of the third vector C by the magnitude of the first vector A, and equating a scalar transmission factor T to the square root of the quotient; saving the scalar transmission factor T to the non-transitory computer-readable medium; recalling the second vector B and the scalar transmission factor T from the non-transitory computer-readable medium; performing an operation on the second vector B and the scalar transmission factor T, the operation including multiplying the second vector B by the square of the scalar transmission factor T, and equating a modified fourth vector M to the product; saving the modified fourth vector to the non-transitory computer-readable medium; recalling the fourth vector D and the modified fourth vector M from the non-transitory computer-readable medium; performing an operation on the fourth vector D and the modified fourth vector M, the operation including subtracting the modified fourth vector M from the fourth vector D, and equating a cross-talk vector V to the difference; and saving the cross-talk vector V to the non-transitory computer-readable medium.

In another aspect, for example, a method for operating an optoelectronic module includes determining a cross-talk-corrected object vector Q. The method includes transmitting light from a transmission channel to a transmissive element and an object at an object distance; receiving light in a collection channel light reflected from the object at the object distance and light reflected from the transmissive element; converting the received light into an object signal; saving the object signal to a non-transitory computer-readable medium as an object vector O; recalling a cross-talk vector V and the object vector O from the non-transitory computer-readable medium; and performing an operation on the cross-talk vector V and the object vector O, the operation including subtracting the cross-talk vector V from the object vector O, the difference being the cross-talk corrected object vector O.

Some implementations include one or more of the following features. For example, the method for operating an optoelectronic module can include saving a cross-talk-corrected object vector Q to a non-transitory computer-readable medium.

In some instances, a method for operating an optoelectronic module includes determining a distance between an optoelectronic module and an object from a phase of a cross-talk-corrected object vector Q.

In some instances, a method for operating an optoelectronic module includes a first target that is reflective to the light transmitting from a transmission channel.

In some instances, a method for operating an optoelectronic module includes a second target that is absorptive to the light transmitting from a transmission channel.

In some instances, a method for operating an optoelectronic module includes a second distance that is greater than a first distance.

In another aspect, a method for operating an optoelectronic module includes light transmitted by a transmission channel that is intensity modulated, and a collection channel includes an array of demodulation pixels operable to demodulate intensity modulated light received by the collection channel.

In a further aspect, a non-transitory computer-readable medium for operating an optoelectronic module includes machine-readable instructions stored thereon. When the instructions are executed by a processor, operations are performed including:

transmitting light from a transmission channel to a first target at a first distance; receiving light in a collection channel reflected from the first target at the first distance; converting the received light into a first signal A; saving the first signal A to the non-transitory computer-readable medium as a first vector A; transmitting light from the transmission channel to a second target at a second distance; receiving light in the collection channel reflected from the second target at the second distance; converting the received light into a second signal B; and saving the second signal B to the non-transitory computer-readable medium as a second vector B.

In another aspect, a non-transitory computer-readable medium includes machine-readable instructions stored thereon. When the instructions are executed on a processor, operations are performed including: transmitting light from a transmission channel to a transmissive element positioned between the transmission channel and a collection channel and a first target and a second target; transmitting light from the transmission channel to the first target at a first distance; receiving in the collection channel light reflected from the first target and light reflected from the transmissive element; converting the received light into a third signal C; and saving the third signal C to a non-transitory computer-readable medium as a third vector C.

In yet another aspect, a non-transitory computer-readable medium includes machine-readable instructions stored thereon. When the instructions are executed on a processor, operations are performed including: transmitting light from a transmission channel to a transmissive element and a second target at a second distance; receiving in a collection channel light reflected from the second target and light reflected from the transmissive element; converting the received light into a fourth signal D; and saving the fourth signal D to a non-transitory computer-readable medium as a fourth vector D.

In another aspect, for example, a non-transitory computer-readable medium includes machine-readable instructions stored thereon. When the instructions are executed on a processor, operations are performed including: recalling a first vector A and a third vector C from a non-transitory computer-readable medium; performing an operation on the first vector A and the third vector C, the operation including dividing the magnitude of the third vector C by the magnitude of the first vector A, and equating a scalar transmission factor T to the square root of the quotient; and saving the scalar transmission factor T to a non-transitory computer-readable medium.

In another aspect, for example, a non-transitory computer-readable medium includes machine-readable instructions stored thereon. When the instructions are executed on a processor, operations are performed including: recalling a second vector B and a scalar transmission factor T from a non-transitory computer-readable medium; performing an operation on the second vector B and the scalar transmission factor T, the operation including multiplying the second vector B by the square of the scalar transmission factor T, and equating a modified fourth vector M to the product; saving the modified fourth vector to the non-transitory computer-readable medium; recalling the fourth vector D and the modified fourth vector M from the non-transitory computer-readable medium; performing an operation on the fourth vector D and the modified fourth vector M, the operation including subtracting the modified fourth vector M from the fourth vector D, and equating a cross-talk vector V to the difference; and saving the cross-talk vector V to the non-transitory computer-readable medium.

In another aspect, for example, a non-transitory computer-readable medium includes machine-readable instructions stored thereon. When the instructions are executed on a processor, operations are performed including: transmitting light from a transmission channel to a transmissive element and an object at an object distance; receiving light in a collection channel light reflected from the object at the object distance and light reflected from the transmissive element; converting the received light into an object signal; saving the object signal to a non-transitory computer-readable medium as an object vector O; recalling a cross-talk vector V and an object vector O from the non-transitory computer-readable medium; and performing an operation on the cross-talk vector V and the object vector O, the operation including subtracting the cross-talk vector V from the object vector O, the difference being a cross-talk corrected object vector O.

In another aspect, for example, a non-transitory computer-readable medium includes machine-readable instructions stored thereon. When the instructions are executed on a processor, operations are performed including: saving a cross-talk-corrected object vector Q to a non-transitory computer-readable medium; and determining a distance between the optoelectronic module and the object from the phase of the cross-talk-corrected object vector Q.

In another aspect, for example, an optoelectronic module includes a transmission channel, a collection channel, a non-transitory computer-readable medium, and a processor. The transmission channel includes a light-emitting component operable to generate intensity modulated light. The collection channel includes an array of demodulation pixels operable to demodulate the intensity modulated light. The non-transitory computer-readable medium includes instructions stored thereon. When the instructions are executed on the processor, operations are performed including: transmitting light from a transmission channel to a first target at a first distance; receiving light in a collection channel reflected from the first target at the first distance; converting the received light into a first signal A; saving the first signal A to the non-transitory computer-readable medium as a first vector A; transmitting light from the transmission channel to a second target at a second distance; receiving light in the collection channel reflected from the second target at the second distance; converting the received light into a second signal B; saving the second signal B to the non-transitory computer-readable medium as a second vector B; transmitting light from the transmission channel to a transmissive element positioned between the transmission and collection channels and the first and second targets; transmitting light from the transmission channel to the first target at the first distance; receiving in the collection channel light reflected from the first target and light reflected from the transmissive element; converting the received light into a third signal C; saving the third signal C to the non-transitory computer-readable medium as a third vector C; transmitting light from the transmission channel to the transmissive element and the second target at the second distance; receiving in the collection channel light reflected from the second target and light reflected from the transmissive element; converting the received light into a fourth signal D; saving the fourth signal D to the non-transitory computer-readable medium as a fourth vector D; recalling the first vector A and the third vector C from the non-transitory computer-readable medium; performing an operation on the first vector A and the third vector C, the operation including dividing the magnitude of the third vector C by the magnitude of the first vector A, and equating the scalar transmission factor T to the square root of the quotient; saving the scalar transmission factor T to the non-transitory computer-readable medium; recalling the second vector B and the scalar transmission factor T from the non-transitory computer-readable medium; performing an operation on the second vector B and the scalar transmission factor, the operation including multiplying the second vector B by the square of the scalar transmission factor T, and equating the modified fourth vector M to the product; saving the modified fourth vector to the non-transitory computer-readable medium; recalling the fourth vector D and the modified fourth vector M from the non-transitory computer-readable medium; performing an operation on the fourth vector D and the modified fourth vector M, the operation including subtracting the modified fourth vector M from the fourth vector D, and equating the cross-talk vector V to the difference; saving the cross-talk vector V to the non-transitory computer-readable medium. Moreover, the processor is operable to execute the instructions stored on the non-transitory computer-readable medium.

In another aspect, for example, an optoelectronic module includes a non-transitory computer-readable medium with instructions stored thereon. When the instructions are executed on a processor, operations are performed including: transmitting light from a transmission channel to a transmissive element and an object at an object distance; receiving light in a collection channel light reflected from the object at the object distance and light reflected from the transmissive element; converting the received light into an object signal; saving the object signal to the non-transitory computer-readable medium as an object vector O; recalling a cross-talk vector V and the object vector O from the non-transitory computer-readable medium; performing an operation on the cross-talk vector V and the object vector O, the operation including subtracting the cross-talk vector V from the object vector O, the difference being the cross-talk corrected object vector O; saving the cross-talk-corrected object vector Q to a non-transitory computer-readable medium; and determining the distance between the optoelectronic module and the object from the phase of the cross-talk-corrected object vector Q.

Other aspects, features, and advantages will be apparent from the following detailed description, the accompanying drawings, and the claims

DETAILED DESCRIPTION

Figure 1B:
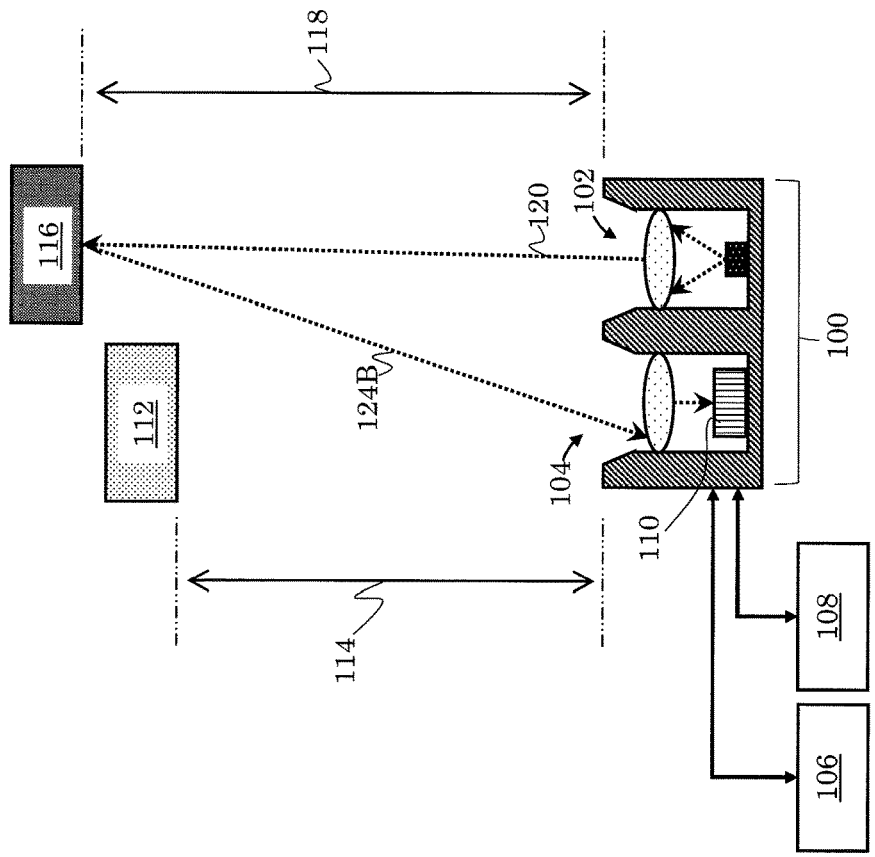
FIG. 1B depicts an example of an optoelectronic module with a second target at a second distance.

FIGS. 1A-FIG. 1D depict an example of an optoelectronic module 100. The optoelectronic module 100 includes a transmission channel 102, a collection channel 104, a non-transitory computer-readable medium 106, and a processor 108. The transmission channel 102 is operable to generate intensity modulated light, and the collection channel 104 includes an array of demodulation pixels 110 operable to demodulate the intensity modulated light. Accordingly, distance data can be generated using the indirect time-of-flight technique.

A first target 112 is depicted at a first distance 114, and a second target 116 is depicted at a second distance 118. Light 120 transmitted from the transmission channel 102 can be directed to the first target 112. Light 124A reflected from the first target 112 can be received in the collection channel 104 as depicted in FIG. 1A. Similarly, light 120 transmitted from the transmission channel 102 can be directed to the second target 116. Reflected light 124B from the second target 116 can be received in the collection channel 104 as depicted, for example, in FIG. 1B.

In some instances, light 120 transmitted from the transmission channel 102 is directed to the first target 112 and to a cover glass 122 positioned between the optoelectronic module 100 and the first target 112 and the second target 116. The cover glass 122 is an example of a transmissive element. Light 124C reflected from the first target 112 can be received in the collection channel 104 and optical cross talk 126C, reflected from the cover glass 122, can be received in the collection channel 104, as depicted, for example, in FIG. 1C.

In some instances, light 120 transmitted from the transmission channel 102 can be directed to the second target 116 and to the cover glass 122 positioned between the optoelectronic module 100 and the first target 112 and the second target 116. Light 124D reflected from the second target 116 can be received in the collection channel 104 and optical cross talk 126D, reflected from the cover glass 122, can be received in the collection channel 104, as depicted, for example, in FIG. 1D.

In some instance, the first target 112 is reflective to the light 120 transmitted from the transmission channel 102. For example, the first target 112 can be a white card. In some instances, the second target 116 is absorptive to the light 120 transmitted from the transmission channel 102. For example, the second target 116 can be a black card. In some instances, the first target 112 is near the optoelectronic module 100 such that the first distance 114 is relatively small (e.g., 100 mm). In some instances, the second target 116 is relatively far from the optoelectronic module 100 such that the distance 118 is relatively large (e.g., 400 mm). Both the first 114 and second 118 distances are dependent on characteristics of the optoelectronic module 100 (e.g., the optical power of the transmission channel and the intended operating range) and properties of the targets (e.g., degree of reflectivity and absorptance). The first target 112 and the first distance 114 are configured such that reflected light 124C is substantially greater than cross talk 126C (e.g., reflected light 124C is multiple orders of magnitude greater than cross talk 126C). The second target 116 and the second distance 118 are configured such that reflected light 124D is not substantially greater than cross talk 126D (e.g., reflected light 124D and cross talk 126D are within the same order of magnitude). In some instances, the cross talk 126C and the cross talk 126D are equal.

The non-transitory computer-readable medium 106 includes machine-readable instructions stored thereon that when executed on the processor 108, perform several operations. The operations can generate calibration data and distance data as illustrated, for example, in FIG. 2 and FIG. 3A-FIG. 3C.

Figure 1A:
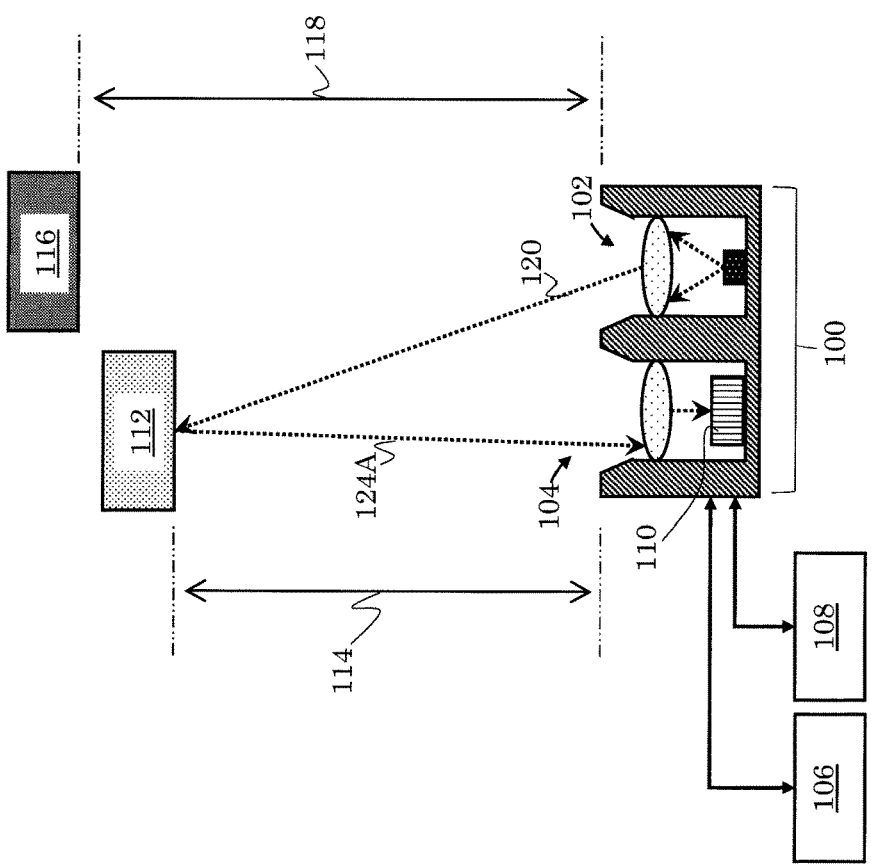
FIG. 1A depicts an example of an optoelectronic module with a first target at a first distance.
Figure 2:
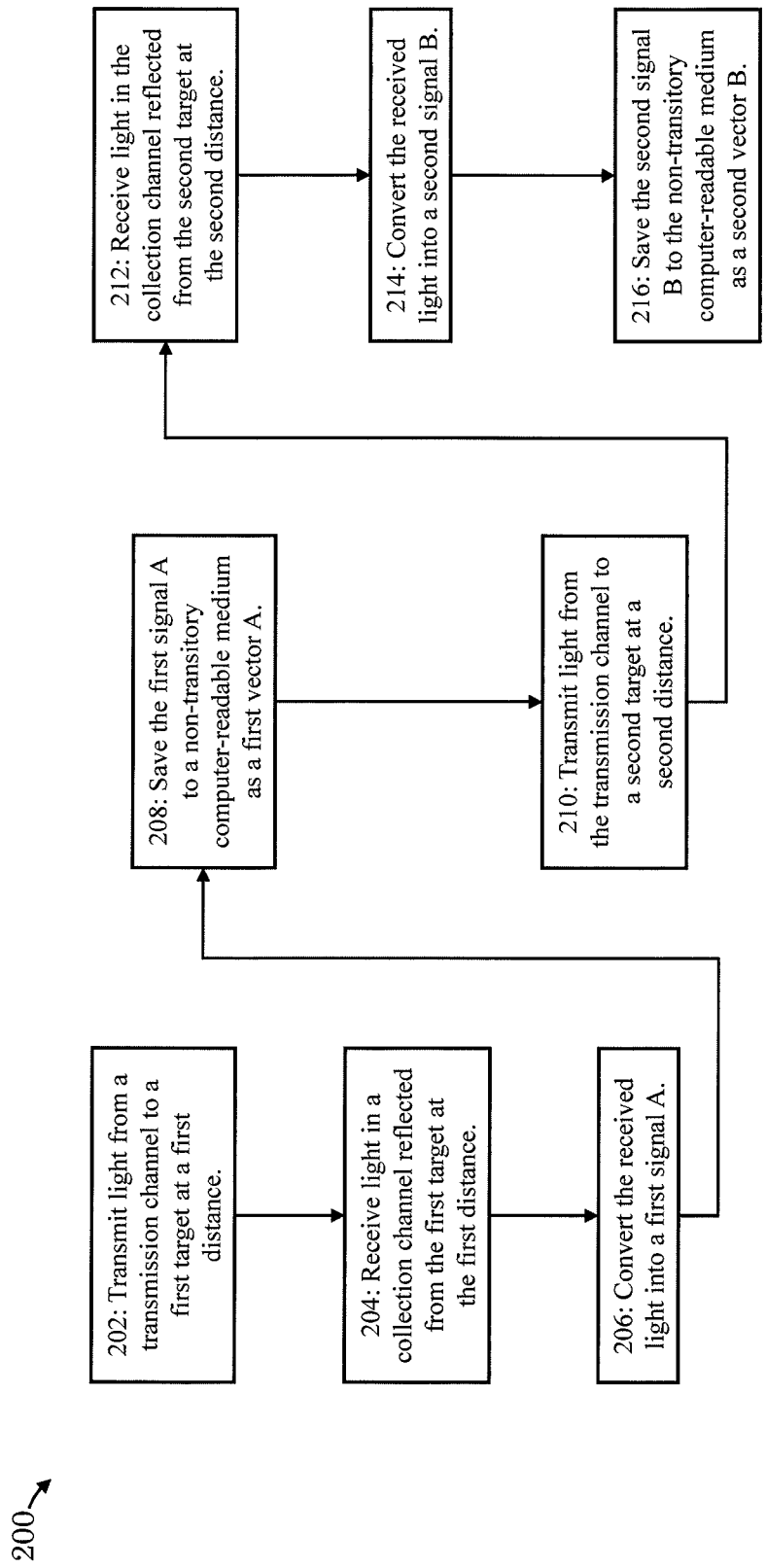
FIG. 2 depicts an example of a method for collecting calibration data.

FIG. 2 depicts an example of a method 200 for collecting calibration data with the optoelectronic module depicted in FIG. 1A-FIG. 1B. At 202, light 120 is transmitted from the transmission channel 102 to the first target 112 at the first distance 114. At 204, light 124A reflected from the first target 112 at the first distance 114 is received in the collection channel 104 as depicted in FIG. 1A. At 206, the received light is converted into a first signal A. At 208, the first signal A is saved to the non-transitory computer-readable medium 106 as a first vector A.

At 210, light 120 is transmitted from the transmission channel 102 to the second target 116 at a second distance 118. At 212, reflected light 124B reflected form the second target 116 at the second distance 118 is received in the collection channel 104 as depicted in FIG. 1B. At 214, the received light is converted into a second signal B. At 216, the second signal B is saved to the non-transitory computer-readable medium 106 as a second vector B.

Figure 3A:
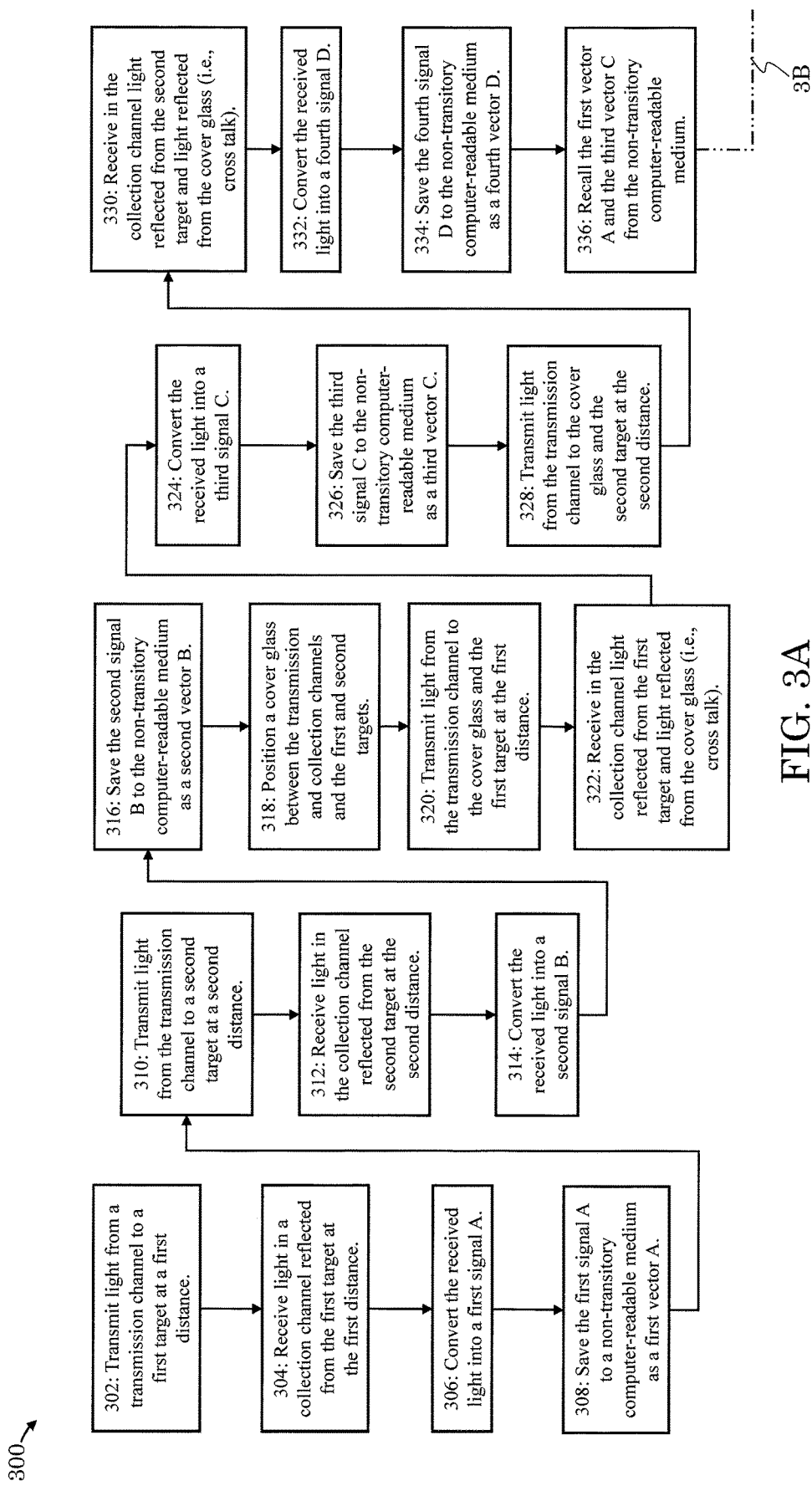
FIG. 3A-3C depict another example of a method for collecting calibration data.
Figure 3B:
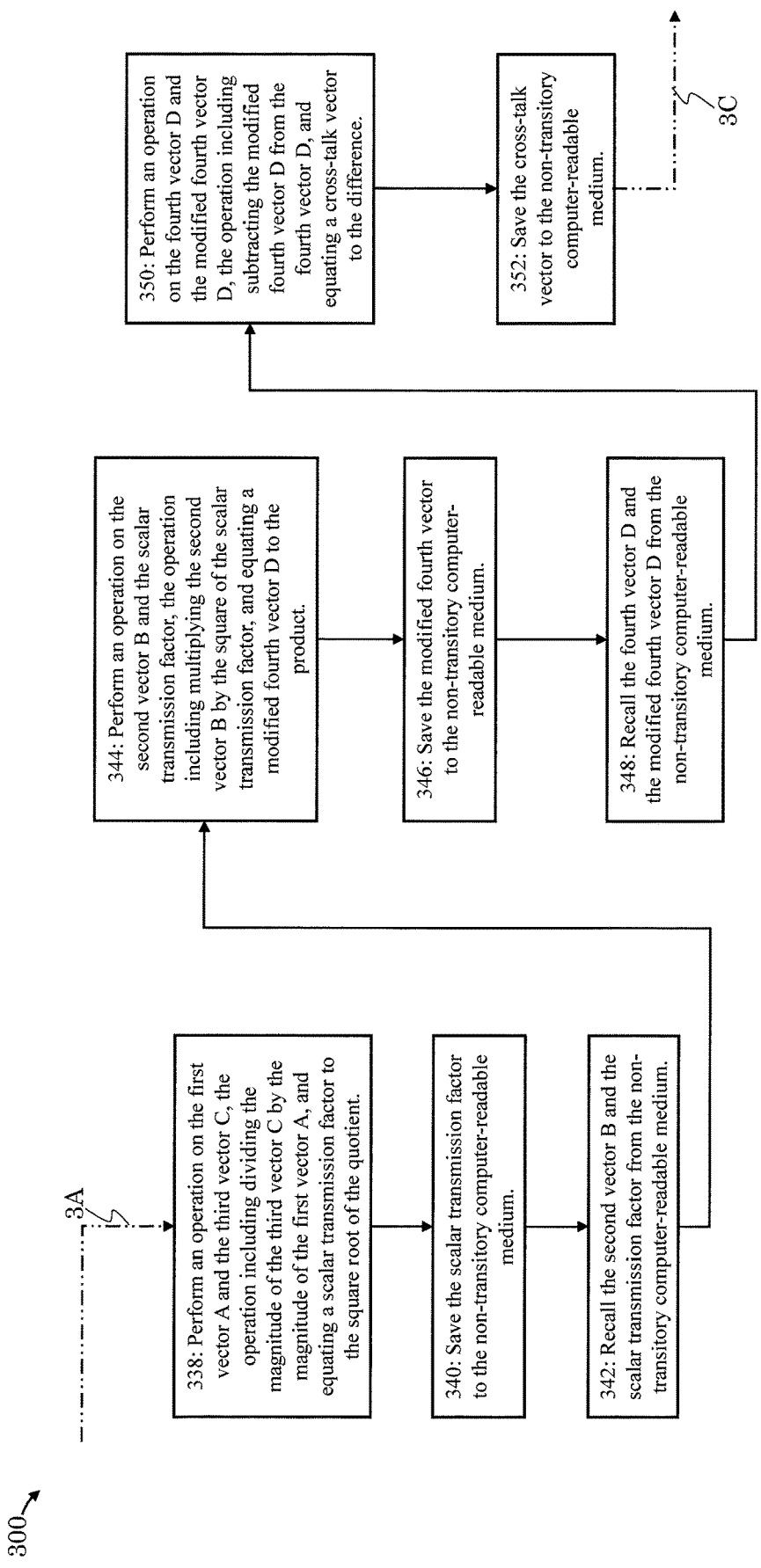
Figure 3C:
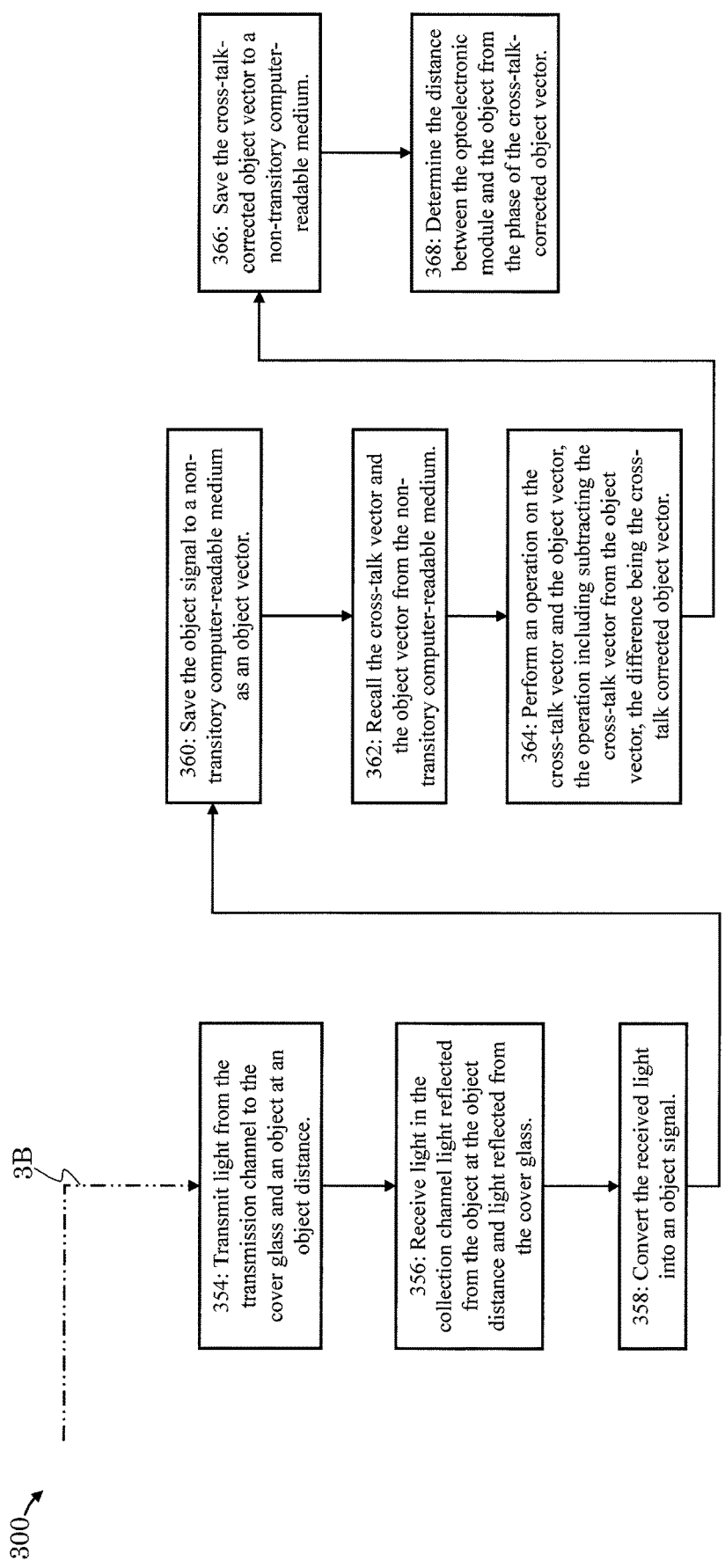

FIG. 3A-3C depict another example of a method 300 for collecting calibration data with the optoelectronic module depicted in FIG. 1A-FIG. 1D. At 302, light 120 is transmitted from the transmission channel 102 to the first target 112 at the first distance 114. At 304, light 124A reflected from the first target 112 at the first distance 114 is received in the collection channel 104 as depicted in FIG. 1A. At 306, the received light is converted into a first signal A. At 308, the first signal A is saved to the non-transitory computer-readable medium 106 as a first vector A.

At 310, light 120 is transmitted from the transmission channel 102 to a second target 116 at a second distance 118. At 312, light 124B reflected form the second target 116 at the second distance 118 is received in the collection channel 104 as depicted, for example, in FIG. 1B. At 314, the received light is converted into a second signal B. At 316, the second signal B is saved to the non-transitory computer-readable medium 106 as a second vector B.

Figure 1D:
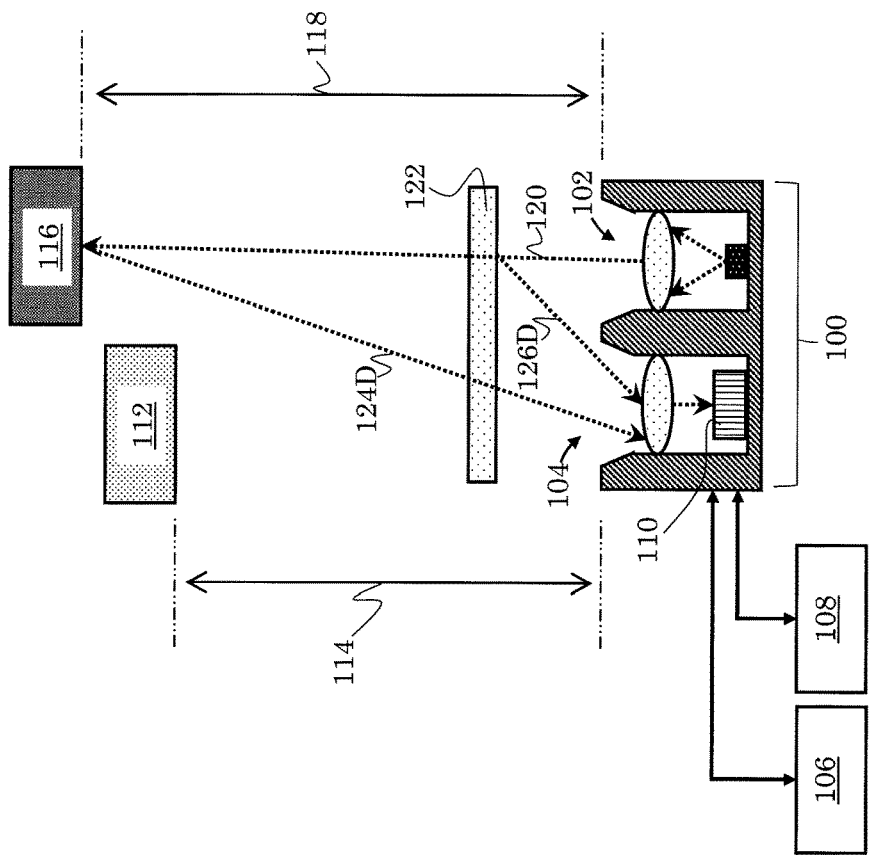
FIG. 1D depicts an example of an optoelectronic module with a second target at a second distance and a cover glass positioned between the example optoelectronic module and the second target.
Figure 1C:
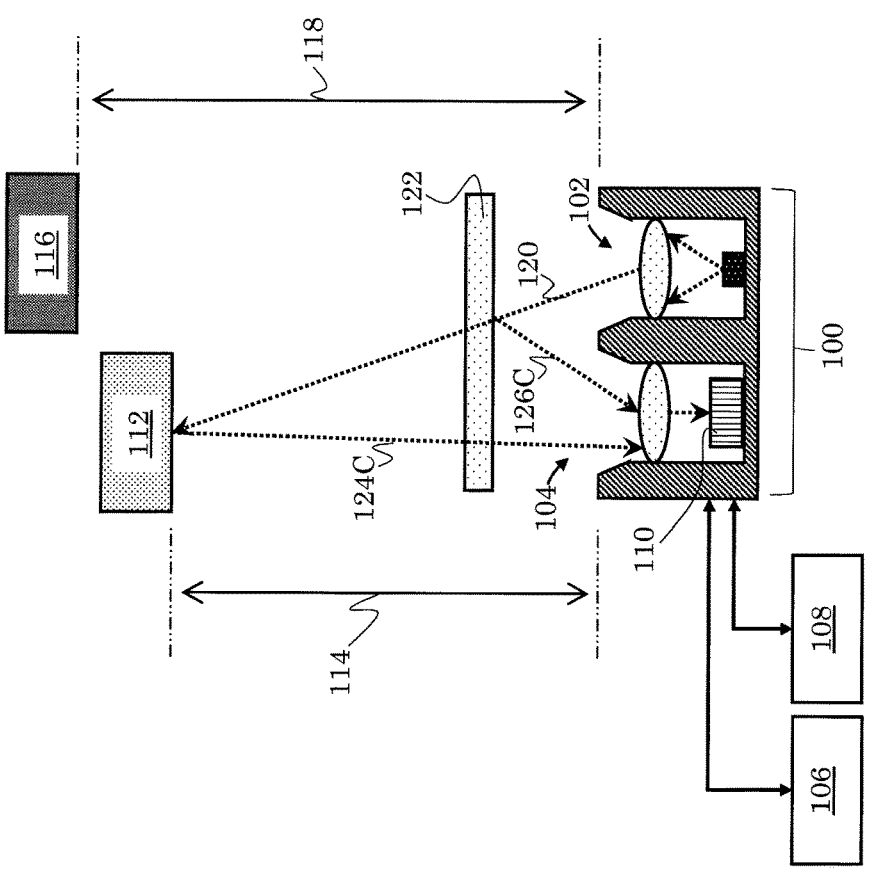
FIG. 1C depicts an example of an optoelectronic module with a first target at a first distance and a cover glass positioned between the example optoelectronic module and the first target.

At 318, the cover glass 122 is positioned between the transmission 102 and collection 104 channels and the first 112 and second targets 116 as depicted in FIG. 1C and FIG. 1D. At 320, the light 120 is transmitted from the transmission channel 102 to the cover glass 122 and the first target 112 at the first distance 114. At 322, light 124C reflected from the first target 112 and cross talk 126C reflected from the cover glass 122 are received in the collection channel 104 as depicted, for example, in FIG. 1C. At 324, the received light is converted into a third signal C.

At 326, the third signal C is saved to the non-transitory computer-readable medium as a third vector C. At 328, light 120 is transmitted from the transmission channel 102 to the cover glass 122 and the second target 116 at the second distance 118. At 330, light reflected from the second target 116 and light reflected from the cover glass 126D are received in the collection channel 104 as depicted, for example, in FIG. 1D.

At 332, the received light is converted into a fourth signal D. At 334, the fourth signal D is saved to the non-transitory computer-readable medium 106 as a fourth vector D. At 336, the first vector A and the third vector C are recalled from the non-transitory computer-readable medium 106.

FIG. 3B depicts further operations of method 300. At 338, an operation is performed on the first vector A and the third vector C. The operation includes dividing the magnitude of the third vector C by the magnitude of the first vector A, and equating a scalar transmission factor T to the square root of the quotient; for example:

$$T=\sqrt{|\hat{C}|/|\hat{A}|}$$

At 340, the scalar transmission factor T is saved to the non-transitory computer-readable medium 106.

At 342, the second vector B and the scalar transmission factor T are recalled from the non-transitory computer-readable medium 106. At 344, an operation is performed on the second vector B and the scalar transmission factor T. The operation includes multiplying the second vector B by the square of the scalar transmission factor T, and equating a modified fourth vector M to the product; for example:

$$\hat{M}=(\hat{B})(T^2)$$

At 346, the modified fourth vector is saved to the non-transitory computer-readable medium 106.

At 348, the fourth vector D and the modified fourth vector M are recalled from the non-transitory computer-readable medium 106. At 350, an operation on the fourth vector D and the modified fourth vector M is performed. The operation includes subtracting the modified fourth vector M from the fourth vector D, and equating a cross-talk vector V to the difference; for example:

$$\hat{V}=\hat{D}-\hat{M}$$

At 352, the cross-talk vector V is saved to the non-transitory computer-readable medium. The cross-talk vector V can be used to calibrate the optoelectronic module 100 for subsequent measurements.

FIG. 3C depict further operations of method 300. At 354, light 120 is transmitted from the transmission channel 102 to the cover glass 122 and an object at an object distance (not depicted). At 356, light reflected from the object at the object distance and light reflected from the cover glass are received in the collection channel 104. At 358, the received light is converted into an object signal. At 360, the object signal is saved to the non-transitory computer-readable medium 106 as an object vector O.

At 362, the cross-talk vector V and the object vector O are recalled from the non-transitory computer-readable medium 106. At 364, an operation is performed on the cross-talk vector V and the object vector O. The operation includes subtracting the cross-talk vector V from the object vector O, the difference being the cross-talk corrected object vector Q; for example:

$$\hat{Q} = \hat{O} - \hat{V}$$

At 366, the cross-talk-corrected object vector Q is saved to the non-transitory computer-readable medium 106. At 368, the distance between the optoelectronic module and the object is determined from the phase of the cross-talk-corrected object vector Q.

Various aspects of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus" and "computer" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Various modifications may be made to the foregoing implementations, and features described above in different implementations may be combined in the same implementation. Further, unless expressly stated or implicitly required, the various operations may be performed in a different order

What is claimed, is:

1. A method for operating an optoelectronic module including a transmission channel and a collection channel, the optoelectronic module operable to transmit light from the transmission channel and receive light in the collection channel, the method comprising:
   transmitting light from the transmission channel to a first target at a first distance;
   receiving light in the collection channel reflected from the first target at the first distance;
   converting the received light into a first signal A;
   saving the first signal A to a non-transitory computer-readable medium as a first vector A;
   transmitting light from the transmission channel to a second target at a second distance;
   receiving light in the collection channel reflected from the second target at the second distance;
   converting the received light into a second signal B;
   saving the second signal B to the non-transitory computer-readable medium as a second vector B;
   positioning a transmissive element between the transmission and collection channels and the first and second targets;
   transmitting light from the transmission channel to the transmissive element and the first target at the first distance;
   receiving in the collection channel light reflected from the first target and light reflected from the transmissive element;
   converting the received light into a third signal C;
   saving the third signal C to the non-transitory computer-readable medium as a third vector C;
   transmitting light from the transmission channel to the transmissive element and the second target at the second distance;
   receiving in the collection channel light reflected from the second target and light reflected from the transmissive element;
   converting the received light into a fourth signal D;
   saving the fourth signal D to the non-transitory computer-readable medium as a fourth vector D;
   recalling the first vector A and the third vector C from the non-transitory computer-readable medium;
   performing an operation on the first vector A and the third vector C, the operation including dividing the magnitude of the third vector C by the magnitude of the first vector A, and equating a scalar transmission factor T to the square root of the quotient;
   saving the scalar transmission factor T to the non-transitory computer-readable medium;
   recalling the second vector B and the scalar transmission factor T from the non-transitory computer-readable medium;
   performing an operation on the second vector B and the scalar transmission factor T, the operation including multiplying the second vector B by the square of the scalar transmission factor T, and equating a modified fourth vector M to the product;
   saving the modified fourth vector M to the non-transitory computer-readable medium;
   recalling the fourth vector D and the modified fourth vector M from the non-transitory computer-readable medium;
   performing an operation on the fourth vector D and the modified fourth vector M, the operation including subtracting the modified fourth vector M from the fourth vector D, and equating a cross-talk vector V to the difference; and
   saving the cross-talk vector V to the non-transitory computer-readable medium.

2. The method of claim 1 further comprising determining a cross-talk-corrected object vector Q, the method comprising:
   transmitting light from the transmission channel to the transmissive element and an object at an object distance;
   receiving light in the collection channel light reflected from the object at the object distance and light reflected from the transmissive element;
   converting the received light into an object signal;
   saving the object signal to a non-transitory computer-readable medium as an object vector O;
   recalling the cross-talk vector V and the object vector O from the non-transitory computer-readable medium; and
   performing an operation on the cross-talk vector V and the object vector O, the operation including subtracting the cross-talk vector V from the object vector O, the difference being the cross-talk corrected object vector Q.

3. The method of claim 2, further comprising saving the cross-talk-corrected object vector Q to a non-transitory computer-readable medium.

4. The method of claim 3, further comprising determining the distance between the optoelectronic module and the object from the phase of the cross-talk-corrected object vector Q.

5. The method of claim 1, wherein the first target is reflective to the light transmitting from the transmission channel.

6. The method of claim 1, wherein the second target is absorptive to the light transmitting from the transmission channel.

7. The method of claim 1, wherein the second distance is greater than the first distance.

8. The method of claim 1, wherein the light transmitted by the transmission channel is intensity modulated, and the collection channel includes an array of demodulation pixels operable to demodulate intensity modulated light received by the collection channel.

9. A non-transitory computer-readable medium for operating an optoelectronic module, comprising machine-readable instructions stored thereon, that when executed on a processor, perform operations including:
   transmitting light from a transmission channel to a first target at a first distance;
   receiving light in a collection channel reflected from the first target at the first distance;
   converting the received light into a first signal A;
   saving the first signal A to the non-transitory computer-readable medium as a first vector A;
   transmitting light from the transmission channel to a second target at a second distance;
   receiving light in the collection channel reflected from the second target at the second distance;
   converting the received light into a second signal B;
   saving the second signal B to the non-transitory computer-readable medium as a second vector B;

transmitting light from the transmission channel to a
transmissive element positioned between the transmission and collection channels and the first and second targets;
transmitting light from the transmission channel to the first target at the first distance;
receiving in the collection channel light reflected from the first target and light reflected from the transmissive element;
converting the received light into a third signal C;
saving the third signal C to the non-transitory computer-readable medium as a third vector C;
transmitting light from the transmission channel to the transmissive element and the second target at the second distance;
receiving in the collection channel light reflected from the second target and light reflected from the transmissive element converting the received light into a fourth signal D;
saving the fourth signal D to the non-transitory computer-readable medium as a fourth vector D;
recalling the first vector A and the third vector C from the non-transitory computer-readable medium;
performing an operation on the first vector A and the third vector C, the operation including dividing the magnitude of the third vector C by the magnitude of the first vector A, and equating a scalar transmission factor T to the square root of the quotient;
saving the scalar transmission factor T to the non-transitory computer-readable medium;
recalling the second vector B and the scalar transmission factor T from the non-transitory computer-readable medium;
performing an operation on the second vector B and the scalar transmission factor T, the operation including multiplying the second vector B by the square of the scalar transmission factor T, and equating the modified fourth vector M to the product;
saving the modified fourth vector M to the non-transitory computer-readable medium;
recalling the fourth vector D and the modified fourth vector M from the non-transitory computer-readable medium;
performing an operation on the fourth vector D and the modified fourth vector M, the operation including subtracting the modified fourth vector M from the fourth vector D, and equating the cross-talk vector V to the difference; and
saving the cross-talk vector V to the non-transitory computer-readable medium.

10. The non-transitory computer-readable medium of claim 9, comprising machine-readable instructions stored thereon, that when executed on a processor, perform operations including:
transmitting light from the transmission channel to the transmissive element and an object at an object distance;
receiving light in the collection channel light reflected from the object at the object distance and light reflected from the transmissive element;
converting the received light into an object signal;
saving the object signal to the non-transitory computer-readable medium as an object vector O;
recalling the cross-talk vector V and the object vector O from the non-transitory computer-readable medium; and
performing an operation on the cross-talk vector V and the object vector O, the operation including subtracting the cross-talk vector V from the object vector O, the difference being the cross-talk corrected object vector Q.

11. The non-transitory computer-readable medium of claim 10, comprising machine-readable instructions stored thereon, that when executed on a processor, perform operations including:
saving the cross-talk-corrected object vector Q to a non-transitory computer-readable medium; and
determining the distance between the optoelectronic module and the object from the phase of the cross-talk-corrected object vector Q.

12. An optoelectronic module comprising:
a transmission channel, a collection channel, a non-transitory computer-readable medium, and a processor;
the transmission channel including a light-emitting component operable to generate intensity modulated light;
the collection channel including an array of demodulation pixels operable to demodulate the intensity modulated light;
the non-transitory computer-readable medium comprising machine-readable instructions stored thereon that when executed on the processor, perform operations including:
transmitting light from a transmission channel to a first target at a first distance;
receiving light in a collection channel reflected from the first target at the first distance;
converting the received light into a first signal A;
saving the first signal A to the non-transitory computer-readable medium as a first vector A;
transmitting light from the transmission channel to a second target at a second distance;
receiving light in the collection channel reflected from the second target at the second distance;
converting the received light into a second signal B;
saving the second signal B to the non-transitory computer-readable medium as a second vector B;
transmitting light from the transmission channel to a transmissive element positioned between the transmission and collection channels and the first and second targets;
transmitting light from the transmission channel to the first target at the first distance;
receiving in the collection channel light reflected from the first target and light reflected from the transmissive element;
converting the received light into a third signal C;
saving the third signal C to the non-transitory computer-readable medium as a third vector C;
transmitting light from the transmission channel to the transmissive element and the second target at the second distance;
receiving in the collection channel light reflected from the second target and light reflected from the transmissive element;
converting the received light into a fourth signal D;
saving the fourth signal D to the non-transitory computer-readable medium as a fourth vector D;
recalling the first vector A and the third vector C from the non-transitory computer-readable medium;
performing an operation on the first vector A and the third vector C, the operation including dividing the magnitude of the third vector C by the magnitude of the first vector A, and equating a scalar transmission factor T to the square root of the quotient;

saving the scalar transmission factor T to the non-transitory computer-readable medium;

recalling the second vector B and the scalar transmission factor T from the non-transitory computer-readable medium;

performing an operation on the second vector B and the scalar transmission factor T, the operation including multiplying the second vector B by the square of the scalar transmission factor T, and equating the modified fourth vector M to the product;

saving the modified fourth vector M to the non-transitory computer-readable medium;

recalling the fourth vector D and the modified fourth vector M from the non-transitory computer-readable medium;

performing an operation on the fourth vector D and the modified fourth vector M, the operation including subtracting the modified fourth vector M from the fourth vector D, and equating the cross-talk vector V to the difference; and saving the cross-talk vector V to the non-transitory computer-readable medium;

wherein the processor is operable to execute the instructions stored on the non-transitory computer-readable medium.

13. The optoelectronic module of claim 12, wherein the non-transitory computer-readable medium comprising machine-readable instructions stored thereon that when executed on a processor, perform operations including:

transmitting light from the transmission channel to the transmissive element and an object at an object distance;

receiving light in the collection channel light reflected from the object at the object distance and light reflected from the transmissive element;

converting the received light into an object signal;

saving the object signal to the non-transitory computer-readable medium as an object vector O;

recalling the cross-talk vector V and the object vector O from the non-transitory computer-readable medium;

performing an operation on the cross-talk vector V and the object vector, the operation including subtracting the cross-talk vector V from the object vector O, the difference being the cross-talk corrected object vector Q;

saving the cross-talk-corrected object vector Q to a non-transitory computer-readable medium; and determining the distance between the optoelectronic module and the object from the phase of the cross-talk-corrected object vector Q.

* * * * *